2 Sheets—Sheet 1.

C. I. FOSTER.

ICE LOWERING APPARATUS.

No. 11,425. Reissued July 3, 1894.

Witnesses
A. W. Stipek
F. H. Grinnold

Inventor
Charles I. Foster,
By James Shepard
Atty.

2 Sheets—Sheet 2.

C. I. FOSTER.

ICE LOWERING APPARATUS.

No. 11,425. Reissued July 3, 1894.

Witnesses
A. H. Stiper
F. H. Grunold.

Inventor
Charles F. Foster
By James Shepard
Atty.

UNITED STATES PATENT OFFICE.

CHARLES I. FOSTER, OF MERIDEN, CONNECTICUT, ASSIGNOR OF ONE-HALF TO GEORGE A. FOSTER.

ICE-LOWERING APPARATUS.

SPECIFICATION forming part of Reissued Letters Patent No. 11,425, dated July 3, 1894.

Original No. 506,777, dated October 17, 1893. Application for reissue filed May 3, 1894. Serial No. 510,008.

*To all whom it may concern:*

Be it known that I, CHARLES I. FOSTER, a citizen of the United States, residing at Meriden, in the county of New Haven and State of Connecticut, have invented certain new and useful Improvements in Apparatus for Lowering Ice, of which the following is a specification.

My invention relates to improvements in apparatus for lowering ice, or other material, and the chief object of my improvement is to provide an apparatus for quickly and conveniently delivering ice from an ice house without breakage.

Figure 1:
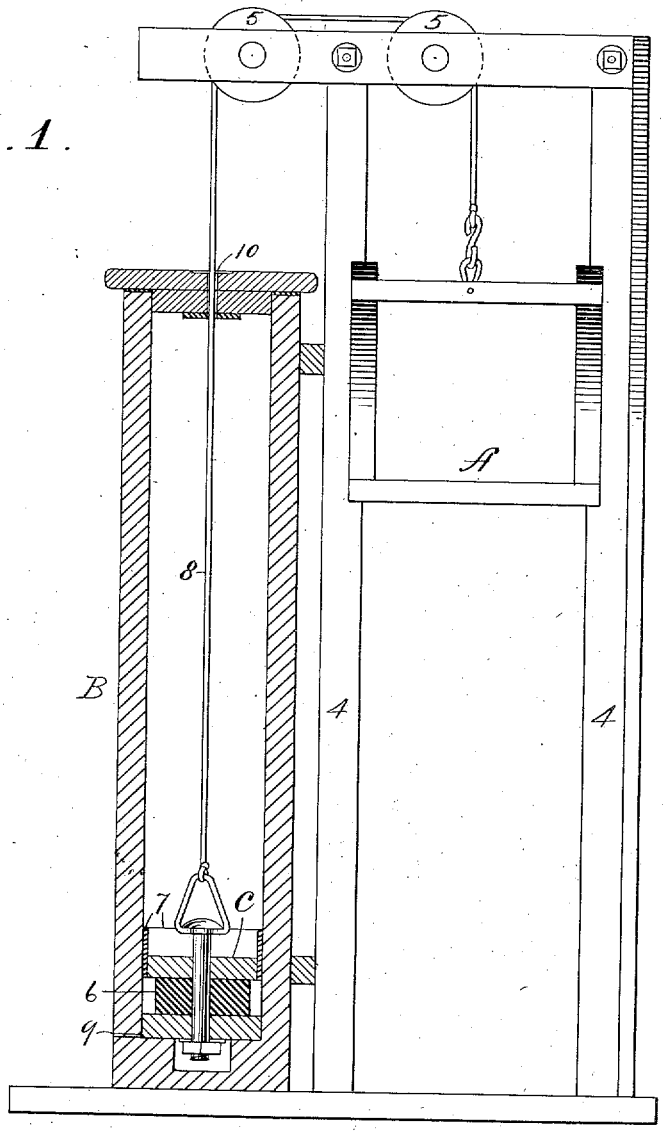
Figure 2:
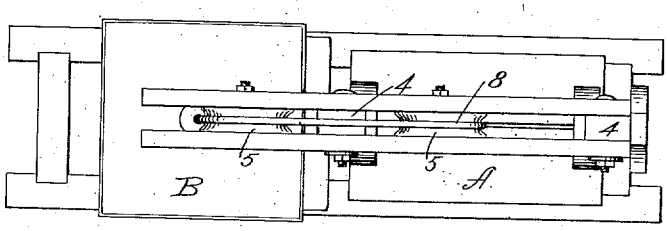
Figure 3:
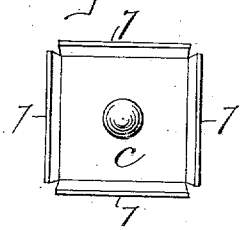

In the accompanying drawings, Figure 1 illustrates in side elevation the principal parts of my apparatus, while a portion thereof is illustrated in vertical section. Fig. 2 is a plan view of the same, and Fig. 3 is a detached plan view of the valved piston.

A designates the ice carriage which is arranged to slide vertically on the ways 4 4 of any suitable frame at the upper part of which frame I provide pulleys 5 5. By the side of the ways 4 4 and parallel thereto I arrange a vertical air box or cylinder B having within it a valved piston C provided with a suitable weight 6 for overbalancing the carriage A. This piston may be of any ordinary construction and provided with a valve which will close, making the piston substantially air tight as it moves in an upward direction, and which will open and allow the air to freely pass from the lower to the upper side of the piston when it descends. I have illustrated this piston as provided with upwardly projecting leather flaps 7 on the edges to serve as valves, but if desired any other form of ordinary valve may be employed. A cord or cable 8 is attached to the piston by one end and to the carriage A by its other end, the cord passing over the pulleys 5 5. The weight thus secured to the piston should be such as to overbalance the carriage A, so that whenever it is lowered it will be immediately returned to the higher part of the frame as shown, while at the same time the weight should not be heavy enough to move the carriage upward too rapidly. The lower end of the air cylinder or box may be made nearly air tight, if desired, or left with a full opening, but I prefer to close said lower end with the exception of a small vent at any convenient place, as for instance the vent 9. The upper end of the cylinder is also made substantially air tight with the exception of a small vent, which as illustrated, is provided for in the orifice 10 through which the cord or cable passes.

In use the carriage will be raised and held in its elevated position by the weighted piston as shown. A cake of ice is placed upon the carriage A and allowed to descend, when the piston rises and compresses the air in the upper end of the cylinder B, and in case the lower end is nearly closed, as shown, air will be drawn by the piston slowly in through the vent 9, while air will also flow out slowly through the vent 10, so that the descent of the loaded carriage is gradual after the piston has compressed the air sufficiently to form a cushion and the carriage strikes the bottom at the end of its fall without any severe shock. If the piston and cylinder are properly fitted there will be but little difference in the speed at which the carriage descends, whether a light or heavy load is placed thereon. After the descent of the carriage, the ice is removed and the carriage is immediately returned automatically by means of the weighted piston and is ready to receive another load. The carriage should be arranged so as to rise as high as the upper tier of the ice in the ice house and as the ice becomes lower in the building, the elevator can be stopped in its ascent at any desired point by means of a suitable break or stop.

I claim as my invention—

The combination of the ice lowering carriage A mounted to move vertically on a suitable frame, the air cylinder, or box B, the piston fitted practically air tight within said cylinder and having a weight for overbalancing the carriage, the cord or cable connecting said piston and carriage, and a valve arranged with said piston and cylinder to form an air cushion when said piston is moved under the influence of the load on the carriage and to permit a free movement when the carriage is moved by the weight of the piston, substantially as described and for the purpose specified.

CHARLES I. FOSTER.

Witnesses:

JAMES SHEPARD,

A. W. STIPEK.